United States Patent
Wienand et al.

(10) Patent No.: US 6,241,146 B1
(45) Date of Patent: *Jun. 5, 2001

(54) PROCESS FOR MANUFACTURING A SENSOR ARRANGEMENT FOR TEMPERATURE MEASUREMENT

(75) Inventors: Karlheinz Wienand, Aschaffenburg; Stefan Dietmann, Haiterbach; Margit Sander, Karlstein, all of (DE)

(73) Assignee: Heraeus Electro-Nite International N.V., Houthalen (BE)

( * ) Notice: Subject to any disclaimer, the term of this patent is extended or adjusted under 35 U.S.C. 154(b) by 0 days.

This patent is subject to a terminal disclaimer.

(21) Appl. No.: 09/351,942

(22) Filed: Jul. 12, 1999

Related U.S. Application Data

(63) Continuation of application No. PCT/EP97/06552, filed on Nov. 24, 1997.

(30) Foreign Application Priority Data

Nov. 13, 1997 (DE) .............................. 197 50 123

(51) Int. Cl.$^7$ .......................... B23K 31/02; B23K 31/00; H01C 7/02; H01C 17/06
(52) U.S. Cl. ...................... 228/248.1; 228/245; 228/232; 29/612; 29/620
(58) Field of Search .............................. 228/232, 248.1, 228/245; 219/385, 386, 388, 428; 432/132, 126, 122, 120, 137, 127; 427/96, 98, 99; 29/612, 620

(56) References Cited

U.S. PATENT DOCUMENTS

| 4,031,272 | | 6/1977 | Khanna . | |
|---|---|---|---|---|
| 4,140,817 | | 2/1979 | Brown . | |
| 4,373,019 | * | 2/1983 | Watanabe et al. . | |
| 4,697,165 | * | 9/1987 | Ishiguro et al. | 338/34 |
| 4,996,005 | * | 2/1991 | Saito et al. . | |
| 5,175,527 | * | 12/1992 | Ishiguro et al. . | |
| 5,216,404 | * | 6/1993 | Nagai et al. | 338/22 |
| 5,720,864 | * | 2/1998 | Nakagiri et al. | 204/421 |
| 5,929,327 | * | 7/1999 | Hafele | 73/118.1 |
| 5,966,577 | * | 10/1999 | Abe | 399/320 |
| 5,993,625 | * | 11/1999 | Inoue et al. | 204/425 |
| 6,004,485 | * | 12/1999 | Osada | 252/510 |
| 6,082,609 | * | 7/2000 | Wienand et al. . | |

* cited by examiner

Primary Examiner—Patrick Ryan
Assistant Examiner—Jonathan Johnson
(74) Attorney, Agent, or Firm—Akin, Gump, Strauss, Hauer & Feld, L.L.P.

(57) ABSTRACT

A process is provided for manufacturing a sensor arrangement for temperature measurement with a temperature-sensitive measuring resistance which has a thin, metal resistance layer electrically insulated toward the outside, and exposed contact surfaces on a ceramic substrate. The contact surfaces are connected electrically conducting and directly mechanically fast with high temperature-resistant conductor paths electrically insulated from one another on a ceramic carrier element. The measuring resistance is bonded and attached by application to and subsequent firing on a carrier element prepared prior to outfitting. A platinum-containing thick film conducting paste serves as a means for attachment and bonding. Contact surfaces for connecting a plug or cable are arranged at the end of the carrier element facing away from the measuring resistance. The temperature sensor, a standard component in the form of a flat measuring resistance, is applied to the ceramic carrier element without the use of wires as an SMD component. The sensor arrangement manufactured by the process is suited for temperature measurements even above 400° C. The process is economical in that it uses a few standardized individual component parts and easily automatable operation steps.

5 Claims, 4 Drawing Sheets

PROCESS FOR MANUFACTURING A SENSOR ARRANGEMENT FOR TEMPERATURE MEASUREMENT

CROSS REFERENCE TO RELATED APPLICATION

This application is a continuation of International Application PCT/EP97/06552, filed Nov. 24, 1997, the disclosure of which is incorporated herein by reference.

BACKGROUND OF THE INVENTION

The invention concerns a process for manufacturing a sensor arrangement for temperature measurement comprising a temperature-sensitive measuring resistance which has a thin metal film as a resistance layer and contact surfaces on a ceramic substrate, wherein the resistance layer is covered by an electrically insulating protective layer. The contact surfaces are, however, electrically conductive and are directly and firmly connected with conductor paths, which are electrically insulated from one another, on a high temperature-resistant carrier element, wherein the measuring resistance is bonded on one end of the carrier element, and on the end of the carrier element facing away from the measuring resistance, contact surfaces are arranged for connecting a contact clip, plug or cable.

A process for bonding electrical conductors in the form of fine wires or bands with electrical conductor paths is known from German published patent application DE 34 24 387 A1. According to this publication, Pt wires with a diameter of about 0.1 to 0.5 mm are connected electrically and mechanically fixed on a ceramic substrate, in which a thick layer paste is applied to the conductor paths on the ceramic substrate. The wires are laid into this paste and run through a firing process together with the paste.

Furthermore, printed circuit boards are adequately known as carrier elements for passive or active components, for example from German patent DE 39 39 165 C1 or German utility model DG 87 16 103 U1. Since most of these components find applications in the temperature range up to a maximum of 150° C., the board material is also usually designed only for this temperature range. As a rule, these materials are plastics, which are often reinforced with inorganic materials. To the extent that a wireless bonding of the components is provided, as is typical, for example, also with temperature measurement resistances for application as calorimetric sensors (see German patent DE 44 24 630 C1), this takes place with soft solder and/or by means of conductive glue. These connection techniques to plastic boards are, however, completely unsuited for temperatures above 300° C.

A sensor arrangement, likewise for calorimetry, is known from German utility model DE 295 04 105 U1, in which a short (15 mm long) ceramic layer is used as a carrier element. Since use as a calorimetric sensor is indicated here as well, one must assume that the bonding is provided by soft solder, which likewise only permits a maximum operating temperature of 300° C.

Further procedures for producing sensor arrangements with temperature measuring resistances for high temperature applications according to the state of the art (described, for example, in German utility models DGm 1,784,455 and DGm 1,855,262) are so designed that first the connection wires of the measuring resistance are lengthened by electrically insulated connection wires of the connection circuit. The connection from the rather thin connection wire of the measuring resistance to the considerably thicker connection wire of the supply circuit is produced by welding or hard soldering. If a fiber glass-jacketed supply lead is used, it must first be stripped. In order to rule out a short circuit during operating conditions, an electrical insulation for the connection wires of the measuring resistance and for the area of the weld or hard solder joint must be provided in some form. Moreover, the connection wires must be relieved from traction either by cast masses or special ceramic molded parts (see DGm 1,855,262).

The electrical insulation of the connection circuit for high temperature use is accomplished either with ceramic capillary tubes, which, however, constitute a large proportion of the overall material costs and often stand in the way of miniaturization due to their geometrical dimensions, or is ensured by fiberglass casings, which are stiffened by an organic impregnation for production reasons. This impregnation must be removed in an extra firing process. For fixing the position of the measuring resistance, it is furthermore customary to introduce a ceramic adhesive into the tip of the measuring unit protective tube. According to the prior art, a high temperature measuring unit is thus produced with a great number of individual parts and process steps, which either cannot be automated at all, or are automatable only at great expense.

SUMMARY OF THE INVENTION

Against this background, underlying the present invention is the object of creating an economical process for manufacturing a sensor arrangement, the process comprising a few standardized individual parts and being on the basis of easily automatable process steps from SMD (surface mounted device) technology. This sensor arrangement should be suitable for temperature measurement above about 400° C.

The object is accomplished according to the invention for the process of manufacturing a sensor arrangement for temperature measurement, in that at least one thick film conducting paste is applied to the contact surface of the carrier element and/or the measuring resistance before the measuring resistance is laid on the high temperature-resistant carrier element provided for it. The measuring resistance with its contact surfaces is then set upon the carrier element and then fired in a temperature range between 1000° C. and 1350° C. and thereby bonded and attached.

Applying the paste can take place by screen printing, dispensers or brushing, for example. Subsequently, the measuring resistance is bonded by the so called flip chip technique. That is, it is set down with its contact surfaces ("face down") on the corresponding contact surfaces of the carrier element which have been pre-prepared with thick film conductive paste, and then fired at temperatures between 1000° C. and 1350° C. Additional aids for fixing the position are not necessary with the process of the invention, since the thick film conducting paste pressed on in the screen printing process has an approximately rectangular profile so that, in contrast with the spherical surface of solder pads, the flat measuring resistance remains in its position after being applied. This process requires fewer individual operations and can be easily automated.

Thick film conducting pastes of PtPd, PtRh or Pt have proven themselves as a contact-forming layer for the contact surfaces for bonding the measuring resistance. In order to improve the adhesion between the contact surfaces and the carrier element or the ceramic substrate of the measuring resistance, it has proven advantageous to construct the contact surfaces in several layers, as a so-called thick film system, in which preferably two thick film conducting pastes are applied one after the other to the contact surfaces, wherein the thick film conducting paste for the first application to the contact surfaces contains in addition to Pt, PtPd or PtRh a fritted glass component which improves the adhesion to the base, while the paste for the repeated application must contain no fritted glass in addition to Pt, PtPd or PtRh and organic binding agent. The fritted glass component in the first thick film conducting paste amounts to about 0.5 to 20% by weight. Since the measuring resistance as a standard component is frequently equipped with platinum contact surfaces, the use of a platinum paste or a paste containing a platinum alloy is an expedient choice.

Preferably, a firing temperature of 1200° C. is selected for attaching and bonding the measuring resistance to the carrier element, for which 15 minutes is expedient as a period for holding at peak temperature.

Setting the measuring resistance on the contact surfaces of the carrier element can take place directly on the still wet thick film conducting paste or, alternatively, only after pre-drying at temperatures between 50° C. and 400° C., and optionally after a pre-sintering of the thick film conducting paste at a temperature between 1000° C. and 1350° C., preferably about 1200° C., subsequent to the pre-drying.

Outfitting the preferably ceramic carrier element, prepared with conductor paths and contact surfaces, preferably takes place in multi-unit panels with SMD outfitting machines. Before feeding into the outfitting machine, the contact surfaces for the measuring resistance are printed with a thick film conducting paste in a screen printing process. The measuring resistance is set upon these contact pads such that its contact surfaces cover the contact surfaces on the carrier element. The outfitted carrier elements are subsequently dried and fired in a continuous heating furnace. In this way, both a mechanical attachment of the measuring resistance on the carrier element by the contact surfaces is attained, and the electrical connection between measuring resistance and the supply leads on the carrier element is produced.

Subsequent to this, the multi-unit panel is divided, which can take place by breaking along previously scored lines on the substrate panel, or by sawing or lasers. With appropriate layout execution, the measuring resistances can also be installed in a line-like multi-unit panel on the printed circuit board multi-unit panel. In this case, the measuring resistances are then separated together with the carrier elements. Defective or not completely functional sensor arrangements can be detected and, if need be, suitably sorted out by an electrical conductivity test, sensibly prior to separating the outfitted carrier elements. In addition to the core of the outfitted carrier elements, only a few further components are now required for completion into a measuring unit. Assembly of these parts is easily possible with very economical manufacturing techniques. The manufacturing process generally allows a high degree of automation.

The sensor arrangement produced by the process of the invention can have the following constructive features:

Proceeding from the measuring resistance which bridges over the contact surfaces, at least two conductor paths lead to the other end of the carrier element, where a further pair of contact surfaces for the plug or cable connection are located. Ceramics, glass, glass ceramics or a metal which is electrically insulated on its surface come into consideration as high temperature-resistant materials for the carrier element, for which aluminum oxide ($Al_2O_3$) has proven itself as a conventional substrate material for thick film or thin film circuits. In addition, other oxide ceramic or non-oxide ceramic materials, as well as a broad range of glasses and glass ceramics, are also suitable to the extent that they meet the requirements of the respective temperature range and of the temperature change stability. Temperature changes are to be considered to the extent that a sensor arrangement of the invention is used, for example, for monitoring the temperature of a catalyst in an exhaust gas facility, for example of a motor vehicle.

The material for the conductor paths and the contact surfaces, which are applied to the preferably ceramic carrier element in thick film and/or thin film technology, must likewise meet the set standards. The structuring possibilities of thick and thin film technologies permit an economical application of simple circuit designs on the multi-unit panels, wherein with a substrate area of 4×4 inches (101.6× 101.6 $mm^2$), up to 38 carrier elements of a size of 101.6× 2.54 $mm^2$, or with a substrate area of 3×3 inches, up to 38 carrier elements of a size of 38.1×3.81 $mm^2$ can be metallized (and outfitted) in one operation.

If a certain fitting position demands an especially narrow type of construction of the sensor arrangement, the ceramic carrier element can be reduced to a width of about 1 mm. In this case, one will no longer accommodate the two conductor paths and contact surfaces for the plug or cable connection on one side of the carrier element, but will arrange one conductor path and one plug contact surface on the reverse side of the carrier element. The connection from the reverse side supply lead conductor path to the corresponding contact surface for the measuring resistance is made by means of a through-bonding boring through the carrier board in the area of the measuring resistance to be bonded.

The sensor arrangement manufactured according to process of the invention can also include the fixing and bonding of a plurality of measuring resistances on a carrier board, whereby a subassembly, for example, can be obtained, which represents a heat tone sensor. Here, at least one of two measuring resistances is covered by a catalyst layer, on which reactions with individual gas components in the exhaust stream of a motor vehicle take place, which bring about a rise in temperature. The increased temperature is compared with a reference temperature, which is independent of the gas components of the exhaust gas. One thereby obtains information about the exhaust gas composition and the concentration of individual exhaust gas components.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings.

DETAILED DESCRIPTION OF THE INVENTION

The process of the invention includes the following sequences, for example:

An aluminum oxide substrate with dimensions of 101.6×101.6×0.6 mm$^3$ (a 4×4 inch standard substrate), 76.2×76.2×0.6 mm$^3$ (3×3 inches) or 50.8×50.8×0.6 mm$^3$ (2×2 inches) has parallel laser scoring at a spacing of 2.5 mm or 3.8 mm. Two conductor paths are respectively installed on one side of the substrate in strips designated by the laser scoring. These conductor paths are applied in thick or thin layer processes and are structured. They comprise substantially Pt or PtPd or PtRh.

This so-prepared ceramic substrate is inserted into the intake of a screen printing facility. By an appropriately dimensioned filter screen, contact surfaces, preferably of platinum, are printed on the end of the conductor paths, where the temperature-sensitive measuring resistance is to be installed. The spacings and geometries of these contact surfaces are guided by the dimensions of the measuring resistance to be mounted. For a measuring resistance of the size of 8×2 mm$^2$, the two contact surfaces spaced at a distance of 5 mm have dimensions of about 2.5×1.5 mm$^2$.

The carrier element thus provided with platinum pads is removed from the screen printing device and fed into an SMD outfitting machine, for example a so-called pick and place machine. Here, the measuring resistance is laid as a rule "face down" on the still moist contact pads on the carrier element. Subsequently, a drying takes place, preferably for 30 minutes at 150° C. For the firing, a standard firing profile can be selected which, for a typical platinum paste, has a peak temperature of about 1200° C. for 15 minutes.

With this procedure, the measuring resistances are fastened to the ceramic carrier element and electrically bonded. Testing and monitoring operations now take place, as well as dividing the outfitted carrier elements from the multi-unit panel into individual carrier elements using a breaking device.

Figure 1:
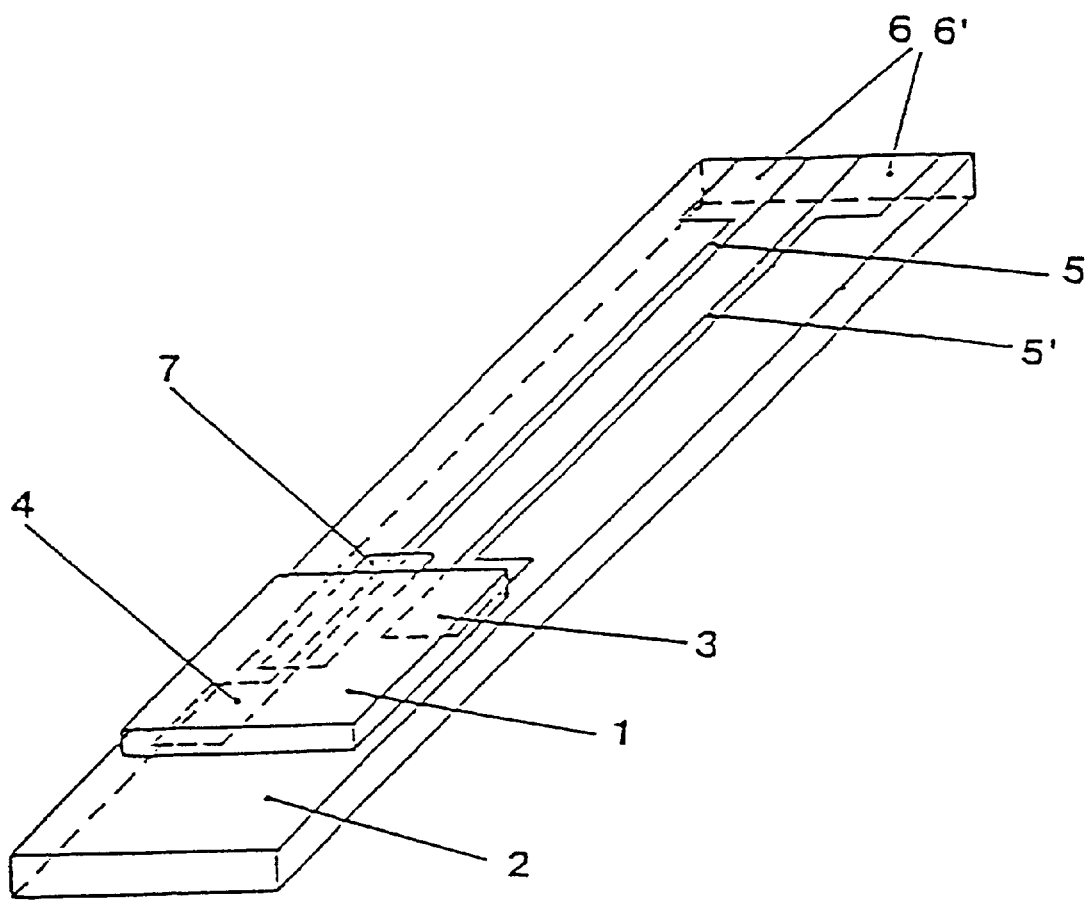
FIG. 1 shows a sensor arrangement on a carrier element.

One embodiment of the sensor arrangement for temperature measurement manufactured with the process of the invention is represented in FIG. 1. The flat measuring resistance 1 is placed on one end of the carrier element 2. Contact surfaces 3, 4 on the carrier element 2 correspond in their geometries and spacings to those of measuring resistance 1, which is fastened and bonded by a fixation firing together with the freshly applied thick film conducting paste (for example a platinum paste). The supply leads or conductor paths 5, 5' run parallel to each other to the cold end of the ceramic carrier element 2, where they terminate in contact surfaces 6, 6' for the contact clip, plug or cable connection. The conductor path material can be PtPd, PtRh or Pt, for example. The uppermost layers 3, 4, 6, 6' of the contact surfaces are preferably made of a Pt thick film paste.

With increased demands with respect to high voltage resistance, it can be advisable to cover the conductor paths 5, 5' with a dielectric. Moreover, to rule out short circuits on the measuring resistance 1, it is advantageous (as also seen from FIG. 1) to insulate the conductor path (which runs further to the tip of the carrier board and there terminates in a contact pad for the measuring resistance 1) by a cover layer 7, at least in the region in which the conductor path is tangent to the flat measuring resistance lying flat on the conductor path. Nominal resistances for this component can be, for example, 100, 200, 500, 1000 or 200 ohm, according to customer-specific applications for which it is provided. Typical dimensions for the carrier boards 2 described are: length 101.6 mm, width 3 mm, thickness 1 mm.

Figure 2:
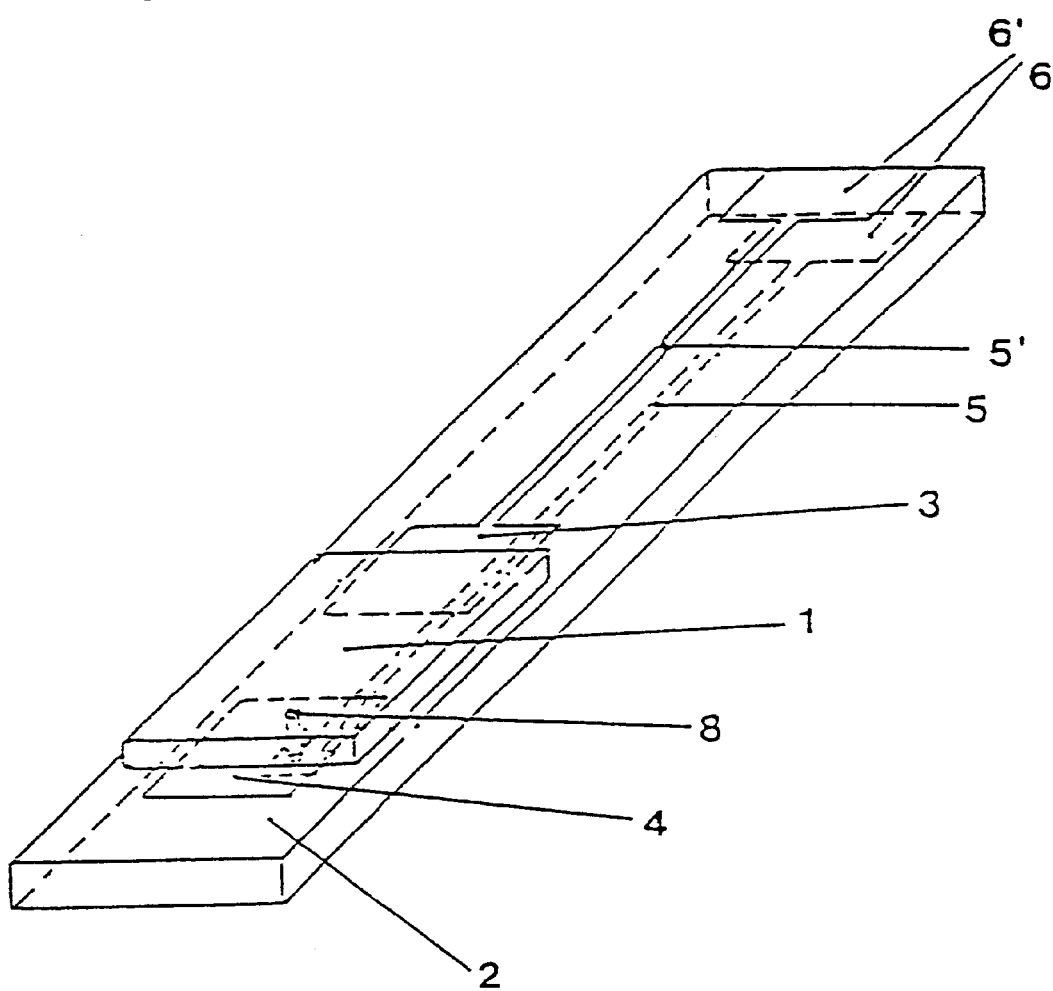
FIG. 2 shows a sensor arrangement on a carrier element with a through-bonding.

FIG. 2 differs from FIG. 1 chiefly in the arrangement of the two conductor paths 5, 5' and the respective plug contact surfaces 6, 6'. These are not arranged on one side of the carrier element 2, but rather on the front and reverse side of the ceramic carrier board 2. The two contact surfaces 3, 4 for the flat measuring resistance 1 are, however, on one side of the carrier element, as in the first embodiment, wherein the connection to the reverse side conductor path 5 is guaranteed by a through-bonding boring 8. The through-bonding boring 8 lies in the area of the second contact surface 4 for the measuring resistance 1. An insulating cover layer for the area of the carrier element 2 covered by the measuring resistance 1 is not necessary here. Moreover, this construction makes possible an especially narrow sensor arrangement, which typically has the following dimensions: for the carrier element 2: 101.6 mm×1 mm; for the flat measuring resistance 1.5×1×0.4 mm$^3$.

Figure 3B:
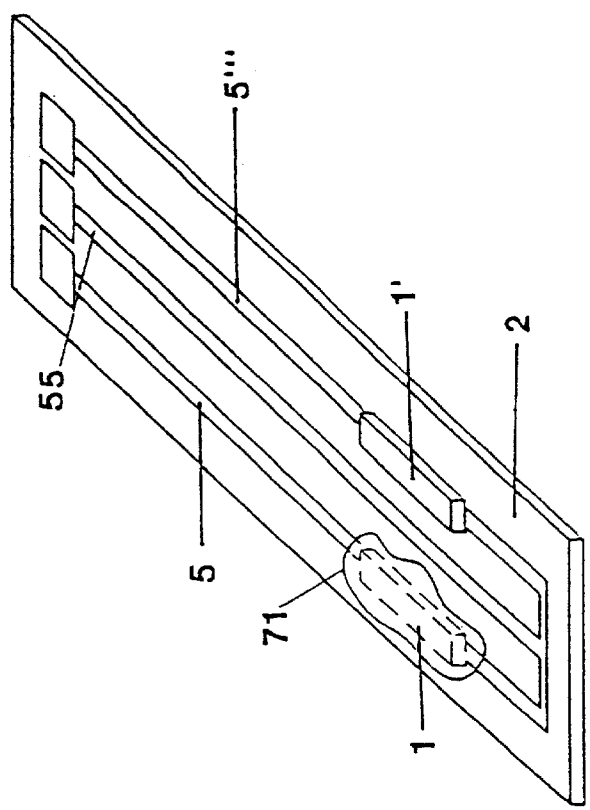
FIGS. 3a and 3b show one sensor arrangement each with two measuring resistances, suited as a heat tone sensor.
Figure 3A:
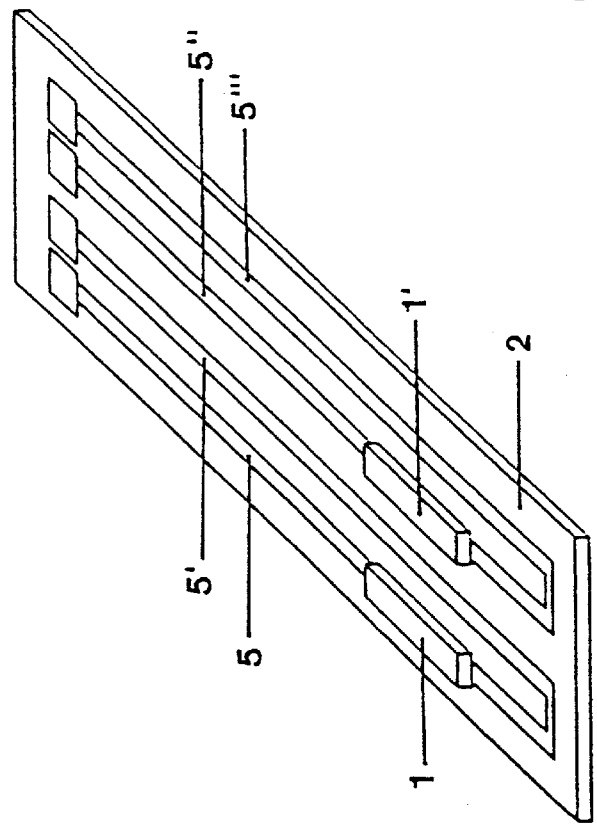

FIG. 3a illustrates a multi-unit sensor arrangement, wherein here two measuring resistances 1, 1' are bonded and fastened on the carrier element 2. The conductor paths 5, 5', 5", 5''' are individually, i.e., galvanically, separately led to the measuring resistance 1 or 1'. Two conductor paths can also be combined into one by so-called center tapping 55, as illustrated in FIG. 3b. The measuring resistance 1 is covered over with a catalytically active layer 71, in accordance with FIG. 3b, on which a transformation of individual gas components takes place by exothermal reactions when this sensor arrangement is used in the exhaust stream of a motor vehicle, for example. The increased temperature associated with this is recorded by the measuring resistance 1 and compared with the temperature value of measuring resistance 1', without a catalytically active layer. The sensor arrangement is designated as a heat tone sensor.

Figure 4:
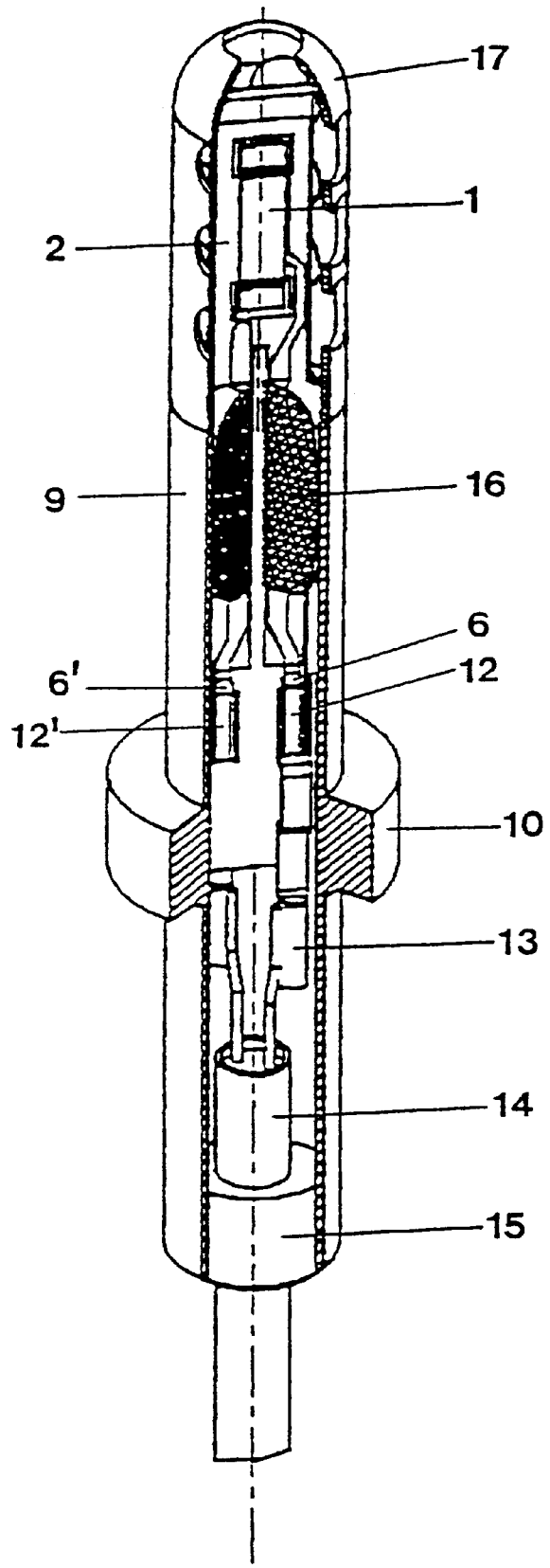
FIG. 4 is an exploded view of a temperature measuring insert.

The arrangement of an outfitted carrier element 2 in a thermometer housing suitable for insertion in the exhaust pipe of a motor vehicle is represented in FIG. 4. The contact surfaces 6, 6' are provided with two U-shaped retaining elements (clips) 12, 12' on the "cold" end of the carrier element 2. These clips have a double function, namely as an electrical connection as well as for the mechanical mounting of the ceramic carrier board 2. The two retaining elements 12, 12' are pushed back parallel to the longitudinal extension of the metal protective tube 9 and onto the two contact surfaces 6, 6' on the carrier element 2, and welded with a laser. The opposite end of the retaining element has a concave shaped part 13. The further electrical connection of the carrier element 2 takes place by means of a mineral-insulated connection 14, which is welded to the concave shaped part 13. The concave shaped part 13 is configured such that it lies exactly against the mineral-insulated connection 14, and consequently can also be welded. The mineral-insulated connection 14 is provided with a bushing 15 and laser welded gas tight outside on the protective tube 9.

Two springy or resilient wire mesh elements 16 arranged parallel to each other are arranged on the carrier element. These elements 16 lie against the inside of the protective tube 9 and support the carrier element 2 mechanically. The different dimensions between the metal protective tube 9 and the ceramic carrier board 2 are compensated for by this solution. The protective tube 9 has a stop collar 10, which determines the desired insertion depth into the exhaust pipe and which can be welded on the outside of the exhaust pipe. For mechanical screening of the sensor arrangement, a locking cap 17 provided with openings is first pushed on the wire mesh elements 16 and positioned, and thereafter welded on the outside to the metal protective tube 9. In a further embodiment, this locking cap 17 can be constructed without openings, whereby the heat is transmitted from the housing wall to the measuring resistance 1 by a heat-conducting filler compound. The filler compound is then situated between locking cap 17 and measuring resistance 1.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

We claim:

1. In a process for manufacturing a sensor arrangement for temperature measurement with a temperature-sensitive measuring resistance element, comprising the steps of:

providing the measuring resistance element, the element comprising a thin metal film as a resistance layer and contact surfaces on a ceramic substrate, covering the resistance layer with an electrically insulating protective layer, connecting the contact surfaces in an electrically conducting and directly mechanically fast manner with high temperature-resistant conductor paths which are electrically insulated from each other on a high temperature-resistant carrier element comprising an electrically insulating material, bonding the measuring resistance element at one end of the carrier element, and arranging the contact surfaces on an opposite end of the carrier element facing away from the measuring resistance element for connection with a contact clip, plug or cable, the improvement comprising:

applying at least a first and a second thick film conducting paste by a double application to at least one of the contact surfaces (3, 4) of the carrier element (2) and the measuring resistance element (1) before placing the measuring resistance element (1) on the high temperature-resistant carrier element (2), wherein only the first thick film conducting paste for a first application to the at least one of the contact surfaces of the measuring resistance element (1) and the carrier element (2) contains a fritted glass component, then placing the measuring resistance element (1) on the carrier element (2) with its contact surfaces, and subsequently firing the carrier element (2) at a temperature range of 1000° C. to 1350° C. to thereby bond and fasten the measuring resistance element (1) to the carrier element.

2. The process for manufacturing a sensor arrangement for temperature measurement according to claim 1, wherein the contact surfaces on the measuring resistance (1) and the carrier element (2) are prepared by the double application of Pt, PtPd or PtRh-containing first and second thick film conducting pastes, wherein the first thick film conducting paste contains in addition to Pt, PtPd or PtRh the fritted glass component comprising about 0.5 to 20% by weight of the paste.

3. The process for manufacturing a sensor arrangement for temperature measurement according to claim 1, wherein the firing takes place by maintaining a temperature of about 1200° C. for about 15 minutes.

4. The process for manufacturing a sensor arrangement for temperature measurement according to claim 1, wherein the thick film conducting paste applied to the contact surfaces prior to placement of the measuring resistance (1) on the carrier element (2) is pre-dried by a heat treatment in a range of 50° C. to 400° C. and/or pre-sintered by a heat treatment in a range of 1000° C. to 1350° C.

5. The process for manufacturing a sensor arrangement for temperature measurement according to claim 4, wherein the pre-drying takes place while maintaining the temperature for about 30 minutes at about 150° C. and the presintering takes place while maintaining the temperature for about 15 minutes at about 1200° C.

\* \* \* \* \*

UNITED STATES PATENT AND TRADEMARK OFFICE
CERTIFICATE OF CORRECTION

| | |
|---|---|
| PATENT NO. | : 6,241,146 B1 |
| DATED | : June 5, 2001 |
| INVENTOR(S) | : Karlheinz Wienand, Aschaffenburg; Stefan Dietmann, Haiterbach; Margit Sander, Karlstein, all of (DE) |

It is certified that error appears in the above-identified patent and that said Letters Patent is hereby corrected as shown below:

<u>Title page,</u>
Assignee, should read as follows:
"Heraeus Electro-Nite International N.V., Houthalen (BE)"

Signed and Sealed this

Fifth Day of February, 2002

Attest:

Attesting Officer

JAMES E. ROGAN
Director of the United States Patent and Trademark Office